(12) United States Patent
Wang et al.

(10) Patent No.: US 9,898,134 B2
(45) Date of Patent: Feb. 20, 2018

(54) IN-CELL TOUCH PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventors: Lei Wang, Beijing (CN); Xiaochuan Chen, Beijing (CN); Hailin Xue, Beijing (CN); Shijun Wang, Beijing (CN); Wenbo Jiang, Beijing (CN); Yanna Xue, Beijing (CN); Yue Li, Beijing (CN); Zhenhua Lv, Beijing (CN); Zhiying Bao, Beijing (CN); Wenjun Xiao, Beijing (CN); Yong Zhang, Beijing (CN); Fuqiang Li, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/906,502

(22) PCT Filed: Aug. 18, 2015

(86) PCT No.: PCT/CN2015/087378
§ 371 (c)(1),
(2) Date: Jan. 20, 2016

(87) PCT Pub. No.: WO2016/119445
PCT Pub. Date: Aug. 4, 2016

(65) Prior Publication Data
US 2016/0378254 A1 Dec. 29, 2016

(30) Foreign Application Priority Data

Jan. 29, 2015 (CN) .......................... 2015 1 0047498

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04111* (2013.01)

(58) Field of Classification Search
CPC combination set(s) only.
See application file for complete search history.

(56) References Cited

U.S. PATENT DOCUMENTS 9,274,662 B2 * 3/2016 Schwartz ................ G06F 3/044
2011/0063537 A1 3/2011 Kim et al.
(Continued)

FOREIGN PATENT DOCUMENTS

| CN | 101446876 A | 6/2009 |
| CN | 202306521 U | 7/2012 |

(Continued)

OTHER PUBLICATIONS

Nov. 10, 2015—International Search Report Appn PCT/CN2015/087378 with Eng Tran of Written Opinion.

(Continued)

*Primary Examiner* — Robin J Mishler
(74) *Attorney, Agent, or Firm* — Banner & Witcoff, Ltd.

(57) ABSTRACT

An in-cell touch panel and a display device are disclosed. The in-cell touch panel includes an array substrate provided with a plurality of sub-pixels, and a plurality of gate lines and a plurality of data lines that are disposed on the array substrate, intersected with each other and insulated from each other, a plurality of self capacitive electrodes which are disposed in a same layer and independent of each other, and a plurality of touch lines connecting the self capacitive electrodes to the touch detection chip; the plurality of gate (Continued)

lines and the plurality of data lines are intersected with each other to define the plurality of sub-pixels; each of the sub-pixels includes a pixel electrode and is configured with a long side and a short side; and the touch lines are disposed along the direction of short sides of the sub-pixels.

15 Claims, 6 Drawing Sheets

(56) References Cited

U.S. PATENT DOCUMENTS

| | | | | |
|---|---|---|---|---|
| 2012/0218199 | A1* | 8/2012 | Kim | G06F 3/044 345/173 |
| 2013/0257794 | A1* | 10/2013 | Lee | G06F 3/041 345/174 |
| 2014/0111710 | A1 | 4/2014 | Yang et al. | |
| 2014/0118277 | A1* | 5/2014 | Kim | G06F 3/044 345/173 |

FOREIGN PATENT DOCUMENTS

| | | |
|---|---|---|
| CN | 102914920 A | 2/2013 |
| CN | 103970340 A | 8/2014 |
| CN | 103970349 A | 8/2014 |
| CN | 104020893 A | 9/2014 |
| CN | 104020909 A | 9/2014 |
| CN | 104020910 A | 9/2014 |
| CN | 104077996 A | 10/2014 |
| CN | 104216564 A | 12/2014 |
| CN | 104536637 A | 4/2015 |

OTHER PUBLICATIONS

Mar. 20, 2017—(CN) First Office Action Appn 201510047498.1 with English Tran.
Oct. 16, 2017—(CN) Second Office Action Appn 201510047498.1 with English Tran.
Oct. 31, 2017—(KR) First Office Action Appn 10-2016-7031023 with English Tran.

* cited by examiner

IN-CELL TOUCH PANEL AND DISPLAY DEVICE

The application is a U.S. National Phase Entry of International Application No. PCT/CN2015/087378 filed on Aug. 18, 2015, designating the United States of America and claiming priority to Chinese Patent Application No. 201510047498.1 filed on Jan. 29, 2015. The present application claims priority to and the benefit of the above-identified applications and the above-identified applications are incorporated by reference herein in their entirety.

TECHNICAL FIELD

Embodiments of the present disclosure relates to an in-cell touch panel and a display device.

BACKGROUND

With the rapid development of display technology, touch screen panels have gradually spread throughout the life of people. So far, touch panels can be classified according to structures as: add-on mode touch panels, on-cell touch panels and in-cell touch panels. An add-on mode touch panel is a liquid crystal display panel having the touch function which is obtained by bonding together a touch panel and a liquid crystal display (LCD), and the touch panel and the liquid crystal display are produced respectively. Add-on mode touch panels have disadvantages such as high production cost, low light transmissivity and thick module. However, in an in-cell touch panel, the touch electrodes of the touch panel are embedded in a liquid crystal display, which can decrease the thickness of the whole module, can greatly reduce the production cost of the touch panel and is favored by panel manufacturers.

SUMMARY

An in-cell touch panel and a display device are provided by the embodiments of the present disclosure.

An in-cell touch panel according to at least one embodiment of the present disclosure comprises an array substrate provided with a plurality of sub-pixels, and a plurality of gate lines and a plurality of data lines that are disposed on the array substrate, intersected with each other and insulated from each other, a plurality of self capacitive electrodes which are disposed in a same layer and independent of each other, and a plurality of touch lines connecting the self capacitive electrodes to a touch detection chip. The plurality of gate lines and the plurality of data lines are intersected with each other to define the plurality of sub-pixels; each of the sub-pixels is configured with a long side and a short side; and the touch lines are disposed along the direction of short sides of the sub-pixels.

For example, a pixel comprises sub-pixels, and the sub-pixels of each pixel are connected with a data line and the plurality of gate lines respectively, i.e., each pixel is driven by the one data line and the plurality of gate lines.

For example, the plurality of touch lines are disposed on the array substrate in a cycle of one or more pixels.

For example, the touch lines and the data lines are disposed on a same layer, and are insulated from each other, and they are routed in a same direction.

For example, each of the sub-pixels comprises a pixel electrode, and the touch lines and the pixel electrodes are disposed on a same layer at the gaps between the two adjacent pixels.

For example, the in-cell touch panel further comprises a plurality of redundant metal lines which are insulated from each other and are disposed on a same layer as the touch lines are disposed; and each of the redundant metal lines is parallel to the touch lines and is connected in parallel with the self capacitive electrode which it overlaps.

For example, an insulating interlayer is provided between the self capacitive electrodes and the touch lines, and the self capacitive electrodes are electrically connected with the corresponding touch lines through via holes which run through the insulating interlayer.

For example, concave parts are provided in the insulating interlayer in the area in which the self capacitive electrodes overlap the other touch lines except the touch lines which are electrically connected with the self capacitive electrodes; the cross-section shape of the via holes is same as the cross-section shape of the concave parts and the concave parts are uniformly distributed in the insulating interlayer.

For example, the opposite side edges of two adjacent self capacitive electrodes are zigzag.

For example, the zigzag opposite side edges of the two adjacent self capacitive electrodes are configured as step-shaped structures, and the two step-shaped structures are of the same shape and match each other.

For example, the zigzag opposite side edges of the two adjacent self capacitive electrodes are configured as concave-convex shaped structures, and the two concave-convex shaped structures are of the same shape and match each other.

For example, the self capacitive electrodes constitutes the common electrode layer which is on the array substrate.

For example, the common electrode layer is disposed between the pixel electrode layer of the array substrate and the base substrate of the array substrate, and an insulating layer is disposed between the pixel electrode layer and the common electrode layer.

For example, the pixel electrode layer is disposed between the common electrode layer and the base substrate of the array substrate, and an insulating layer is disposed between the pixel electrode layer and the common electrode layer.

A display device according to an embodiment of the present disclosure comprises any one of the in-cell touch panels mentioned above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERAL

01: data line; 02: base substrate of array substrate; 03: self capacitive electrode; 04: touch detection chip; 05: touch line; 06: metal line; 07: insulating interlayer; 08: common electrode; 09: pixel electrode; 10: gate line; 11: sub-pixel; A: via hole; B: concave part; L: long side of a sub-pixel; W: short side of a sub-pixel; 20: array substrate; 30: opposite substrate.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Commonly, an in-cell touch panel can realize the detection of the touch position of a finger based on the principles of mutual capacitance or self capacitance. Apple iPhone 5, which is taken as an example, applies the mutual capacitance in-cell touch technology, and the touch electrodes are manufactured on the array substrate, which added at least two masks with respect to the conventional array process, and the signal to noise ratio (SNR) of the mutual capacitance technology can be less than 20 only. A plurality of self capacitive electrodes which are disposed in a same layer and are insulated from each other can be disposed in an in-cell touch panel based on the principle of self capacitance. When the screen is not touched by a human body, the capacitance of each of the self capacitive electrodes is at a fixed value. When the screen is touched by a human body, the capacitance of the corresponding self capacitive electrode is at a value of the fixed value plus the capacitance value of the human body. The touch detection chip can determine the touch position through detecting the change of the capacitance of each of the self capacitive electrodes in the touch period. In the design of a self capacitance mode, the capacitance of a human body can all act on self capacitance; compared with that the case in which the capacitance of a human body can act on projective capacitance of mutual capacitance in the design of a mutual capacitance mode, the change of the touch value caused by touching of a human body is larger. Therefore, compared with a mutual capacitance touch screen, a self capacitance touch screen can effectively increase the signal to noise ratio for touch control, and then increase the accuracy of touch sense.

In an in-cell touch panel, in order to connect the self capacitive electrodes with the touch detection chip, touch lines correspondingly connected with the self capacitive electrodes are usually provided. For example, the touch lines and the patterns of the self capacitive electrodes can be disposed on a same layer, and they also can be disposed on different layers. Although the touch lines and the patterns of the self capacitive electrodes being disposed on a same layer can avoid increasing any new patterning process, the touch lines and the patterns of the self capacitive electrodes being disposed on a same layer may form a touch blind area, and the touch lines connected with a plurality of self capacitive electrodes in the touch blind area are routed through the touch blind area. Therefore, the signals in the touch blind area are relatively chaotic, i.e., the touch performance can not be guaranteed in the area. Based on the above consideration, the touch lines and the self capacitive electrodes are commonly disposed on different layers.

A common electrode (Vcom) multiplex mode is always applied in conventional self capacitance solutions, i.e., the electrodes act as common electrodes in the display period and act as sensing electrodes in the touch period. It is easy to realize the solution and no extra layer is required. However, because there are usually hundreds of the sensing electrodes, hundreds of touch lines are needed. If the lines are led out on the both sides of the panel, the narrow bezel product is difficult to be realized. For this reason, a solution of double data lines is proposed, i.e., signal lines are added in the vertical direction on the layer on which the data signal is transmitted, and act as touch lines. Because extra touch lines are introduced, the width of the black matrix at the corresponding position needs to be increased, which certainly will affect the aperture ratio, especially for the high pixel-per-inch (PPI) products.

Figure 1:
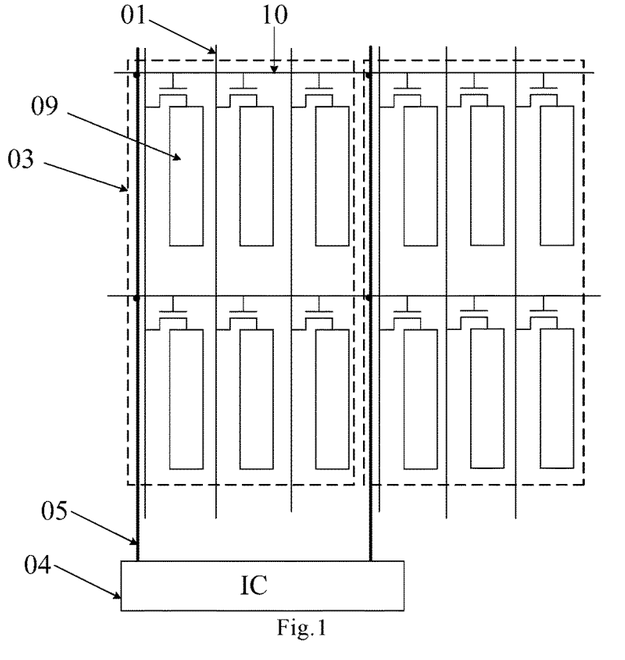
FIG. 1 is a top structure schematic view of an in-cell touch panel.

FIG. 1 is a top structure schematic view of an in-cell touch panel, and shows the schematic of the self capacitive touch solution. A single node is designed as a square electrode (self capacitive electrode 03) of about 5 mm*5 mm. Then the electrode is connected to the touch detection chip 04 through a conductive line; the driving signal Tx is applied to the electrode by the touch detection chip 04, and the electrode can receive the feedback signal. In the working process, for example, the finger for operation is directly coupled, so that the change of the touch value is large. A common self capacitive double data lines solution is shown in the FIG. 1. An extra data line is added for each of the pixels to act as a touch line, and is connected with a self capacitive electrode 03 through a via hole. The touch lines 05 and the data lines 01 are of metal structures in a same layer. Each of the pixels here, for example, comprises three sub-pixels (for example, RGB sub-pixels). A pixel electrode 09 is disposed in each of the sub-pixels correspondingly.

The specific examples of the in-cell touch panel and the display device according to the embodiments of the present disclosure will be described in detail in connection with the figures related to the embodiments of the disclosure. The thickness of the layers and the shapes of the layers in the figures do not reflect the real scale, and the purpose is to only schematically illustrate the content of the present disclosure.

Figure 2A:
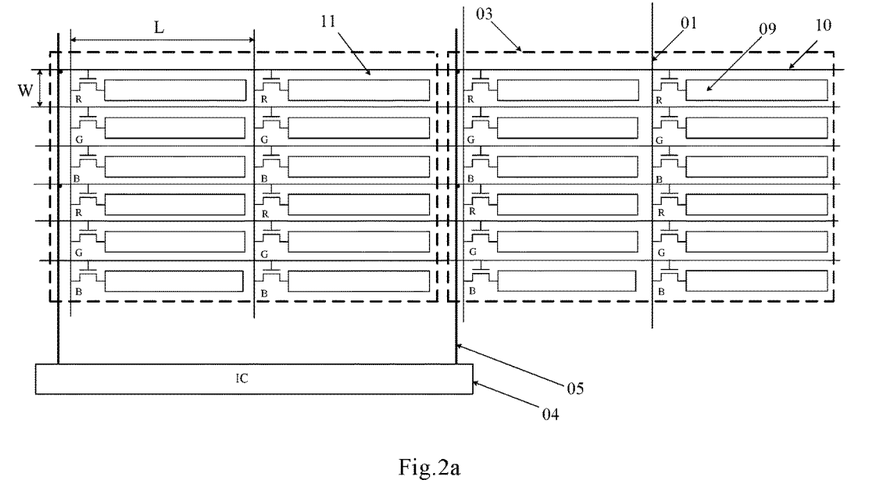
FIG. 2a is a first structure schematic view of an in-cell touch panel according to an embodiment of the present disclosure.
Figure 2B:
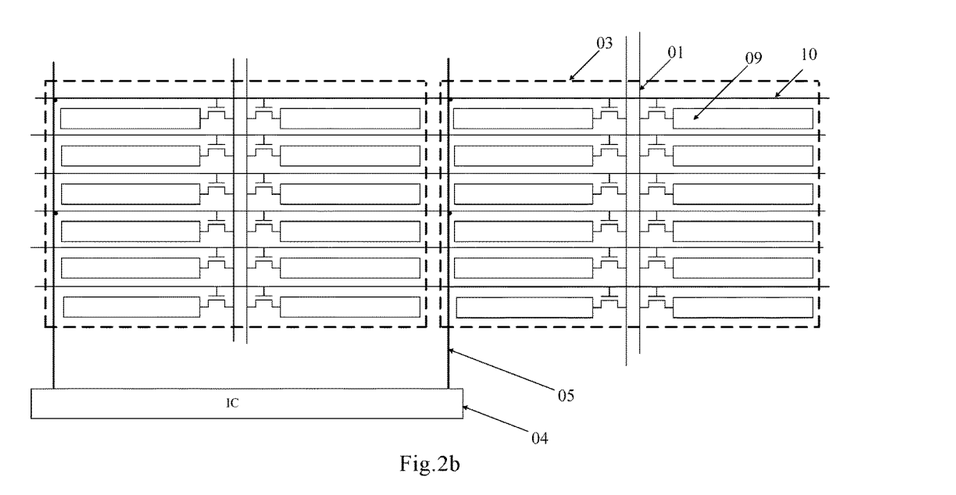
FIG. 2b is a second structure schematic view of an in-cell touch panel according to an embodiment of the present disclosure.

An in-cell touch panel according to at least one embodiment of the present disclosure is shown in FIG. 2a and FIG. 2b. It comprises an array substrate provided with a plurality of sub-pixels 11, and a plurality of gate lines 10 disposed on the array substrate and a plurality of data lines 01 disposed on the array substrate which are intersected with each other and are insulated from each other, a plurality of self capacitive electrodes 03 which are disposed in a same layer and independent of each other, and a plurality of touch lines 05 connecting self capacitive electrodes 03 to the touch detection chip 04 respectively. The plurality of gate lines 10 and the plurality of data lines 01 are intersected with each other to define the plurality of sub-pixels 11; and each of the sub-pixels 11 comprises a pixel electrode 09 and a switching element (for example, a thin film transistor (TFT)). Each of the sub-pixels 11 is configured with a long side and a short side. For example, the length L of a gate line defining a sub-pixel is greater than the length W of the data line defining the sub-pixel. The touch lines 05 are disposed along the direction of the short sides of the sub-pixels. In the example as shown in FIG. 2, the direction of the long sides of the sub-pixels is horizontal, and the direction of the short sides of the sub-pixels is vertical. The touch lines 05 and the data lines 01 are disposed in parallel.

The length L of a gate line defining a sub-pixel is greater than the length W of the data line defining the sub-pixel, so the length of the pixel electrode in the direction of gate line is greater than the length of the pixel electrode in the direction of data line.

The embodiments of the present disclosure can increase the aperture ratio and reduce the power consumption through the new design of the pixel structure and the optimization of the position of touch lines.

For example, a pixel comprises a plurality of sub-pixels, and each pixel is driven by a data line and a plurality of gate lines.

For example, each of pixels comprises three adjacent sub-pixels, such as a red sub-pixel, a green sub-pixel and a blue sub-pixel. Each pixel can be drove by a data line and three gate lines, and the data signals for different sub-pixels (for example, data signals for a red sub-pixel, a green sub-pixel and a blue sub-pixel) are input to the data line in a time-sharing mode.

For example, a plurality of touch lines 05 are disposed on the array substrate in a period of one pixel, or a plurality of touch lines 05 also can be disposed on the array substrate in a period of a plurality of pixels. That is, the touch lines are disposed every other pixel, or the touch lines are disposed every plurality of pixels.

In the embodiments of the present disclosure, for example, "plurality" means two or more than two.

In the pixel structure shown in FIG. 2a and FIG. 2b, a single pixel is driven by three gate signals and a data signal. The touch lines and the data lines are still in a same layer, and the touch lines are connected with the self capacitive electrodes through via holes. That is, the self capacitive electrodes are connected with the corresponding touch lines through the via holes respectively.

The touch lines added in the structure that is shown in FIG. 2a and FIG. 2b are disposed on the short sides of the sub-pixels. Compared with the sub-pixel in the common design, the size of the short side direction of the black matrix is increased, which can greatly decrease the influence onto the aperture ratio. And because the plurality of pixels only need one data line, the configuration also can reduce the number of the channels in the driving IC, and then can reduce the cost and the power consumption and realize a narrow bezel design.

In the specific implement process, the arrangement of the touch lines can be adjusted according to the specific solution such as each of the touch units can be connected by one or more of the touch lines; the amount of via holes can be adjusted according to the require; and the plurality of touch lines are disposed in a cycle of one or more pixels.

For example, the touch lines 05 and the data lines 01 are disposed on a same layer and are insulated from each other, and they are routed in a same direction; in the structure, the touch lines 05 and the data lines 01 can be obtained by the patterning of a same conductive layer (metal layer). In this way, the joints between the touch lines 05 and the touch detection chip 04 do not occupy the two side frames, which is favorable to the narrow bezel design of a touch panel.

For example, in an in-cell touch panel according to an embodiment of the present disclosure, a plurality of sub-pixels 11, a plurality of gate lines 10, a plurality of data lines 01 and a plurality of self capacitive electrodes 03 are disposed on the base substrate of the array substrate.

For example, the orthographic projections, which is projected on the base substrate 02 of the array substrate, of the gaps between two adjacent self capacitive electrodes 03 are located at the gaps of two adjacent pixels.

For example, in order not to affect the aperture ratio of the touch panel, the touch lines 05 added on the layer, on which the data lines 01 are provided, are usually disposed on the gaps between the pixels arranged on the array substrate, and as shown in FIG. 2a, the touch lines 05 can be disposed adjacent to the data lines 01. Furthermore, in order to avoid the problem of the mutual interference of the signals transmitted by the touch lines 05 and the data lines 01, one of the two adjacent columns of sub-pixels can be turned-over horizontally, as shown in FIG. 2b, and the touch lines 05 can be disposed on the gaps between the two adjacent columns of pixels, which gaps are relatively far away from the data lines 01, so that the data lines 01 are relatively far away from the touch lines 05.

Figure 3:
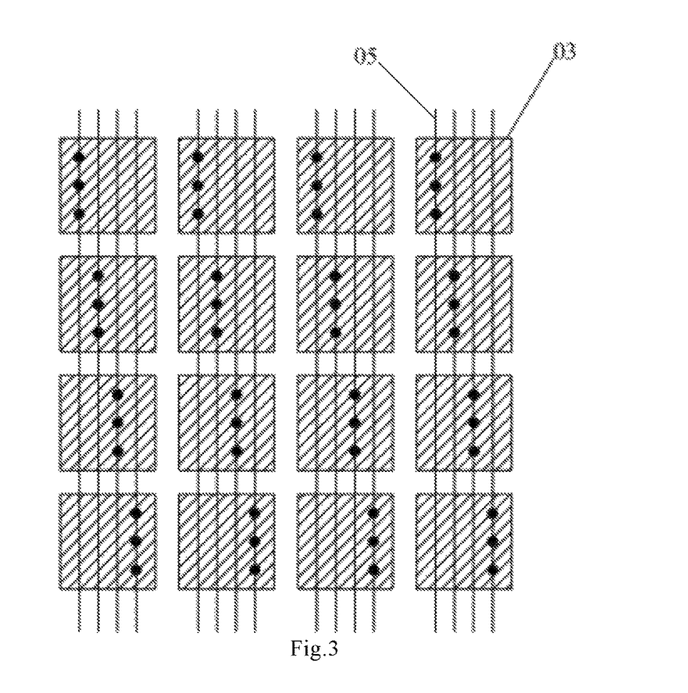
FIG. 3 and FIG. 4 are schematic views illustrating the connection relationship of self capacitive electrodes and touch lines of an in-cell touch panel according to an embodiment of the present disclosure.

For example, the self capacitive electrodes 03 and the touch lines 05 of the touch panel can be disposed in different layers. In order to reduce the resistance of the self capacitive electrodes and increase the signal to noise ratio of the electronic signal transmitted by each of the self capacitive electrodes 03, the self capacitive electrodes 03 can be connected with the corresponding touch lines 05 through via holes, which is shown in FIG. 3. That is, the self capacitive electrodes 03 are connected in parallel with the metal resistors constituted by touch lines 05, which can reduce the resistance of the electrodes to a most extend, and then increase the signal to noise ratio of the signals when they are transmitted by electrodes.

Figure 4:
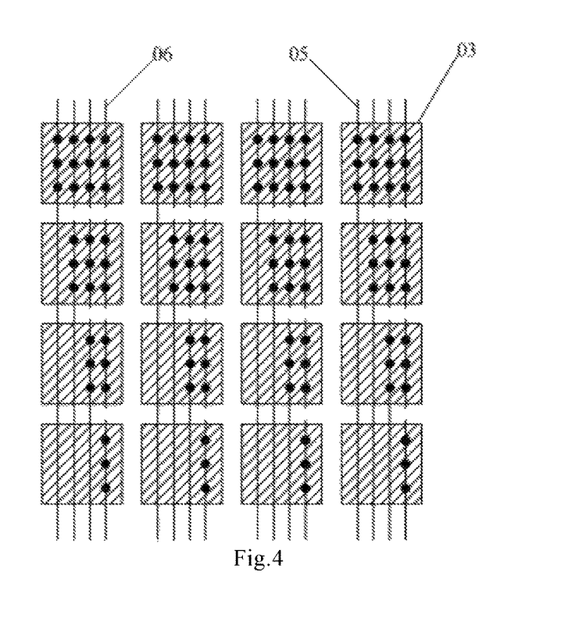

For example, in order to further reduce the resistance of the self capacitive electrodes 03, when the touch lines 05 are designed, as shown in FIG. 4, after each of the touch lines 05 are connected with the corresponding self capacitive electrode, the whole touch lines 05 that originally run through the whole panel can be broken and produces a plurality of touch lines 05 as well as a plurality of metal lines 06 which are insulated from each other and disposed on a same layer on which the touch lines 05 are disposed; each of the metal lines 06 and each of the touch lines 05 are parallel to each other and are connected in parallel with the self capacitive electrode 03 with which it overlaps, that is, they are electrically connected through via holes.

The above design can make full use of the gaps between adjacent sub-pixels. While the aperture ratio of the touch panel is ensured, the redundant part of the touch lines can be used. The redundant metal lines 06 with a low resistance are disposed, and the redundant metal lines 06 with low resistance are in connected in parallel with each of the self capacitive electrodes 03 with high resistance, and this configuration can reduce the resistance of each of the self capacitive electrodes 03 to a most extent.

Figure 5A:
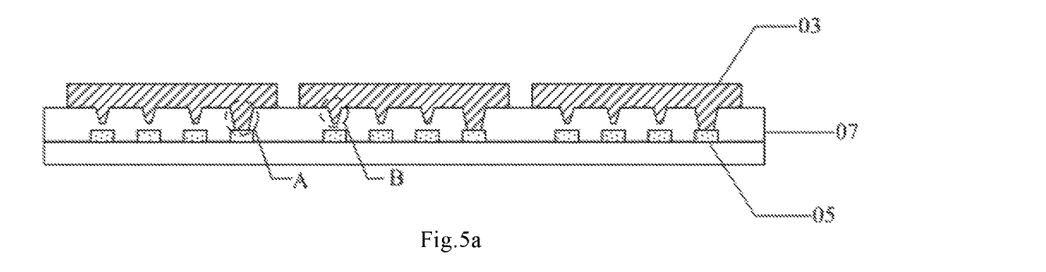
FIG. 5a and FIG. 5b are structure schematic views illustrating the disposition of the real via holes and the dummy via holes in an in-cell touch panel according to an embodiment of the present disclosure.

For example, in the case where the touch lines 05 are connected with the corresponding self capacitive electrodes 03 through via holes, as shown in FIG. 3 and FIG. 4, the distribution of the via holes which connect the self capacitive electrodes 03 and the corresponding touch lines 05 is not uniform over the whole display area, which may affect the uniformity of the whole display image displayed by the touch panel. Due to this reason, an example of the touch panel according to an embodiment of the present disclosure, as shown in FIG. 5a, makes use of the insulating interlayer 07 provided between the self capacitive electrodes 03 and the touch lines 05, and the self capacitive electrodes 03 is electrically connected with the touch lines 05 through the via holes that run through the insulating interlayer 07. Dummy via holes are disposed in the insulating interlayer 07 in the areas in which the self capacitive electrodes 03 overlaps the other touch lines 05 which are not electrically connected with the self capacitive electrodes, i.e., concave parts B are provided in the insulating interlayer 07 in the areas in which the self capacitive electrodes 03 overlaps the other touch lines 05 except the touch lines 05 which are electrically connected with the self capacitive electrodes. The addition of the dummy via holes, which match with the via holes A, disposed in the insulating interlayer 07 ensures the uniformity of the image displayed by the whole display area, and then increase the uniformity of the display images displayed by the display panel.

It should be noted that, in the above touch panel according to an embodiment of the present disclosure, the insulating interlayer 07 disposed between the self capacitive electrodes 03 and the touch lines 05 can be constitute by a plurality of insulating layers, or can be constitute by one insulating layer, and no limitation is placed thereto herein. The via hole A disposed in the insulating interlayer 07 refers to a hole that runs through all the insulating layers of the insulating interlayer 07, and the concave part B disposed in the insulating interlayer 07 refers to a groove that does not run through the insulating interlayer 07.

Figure 5B:
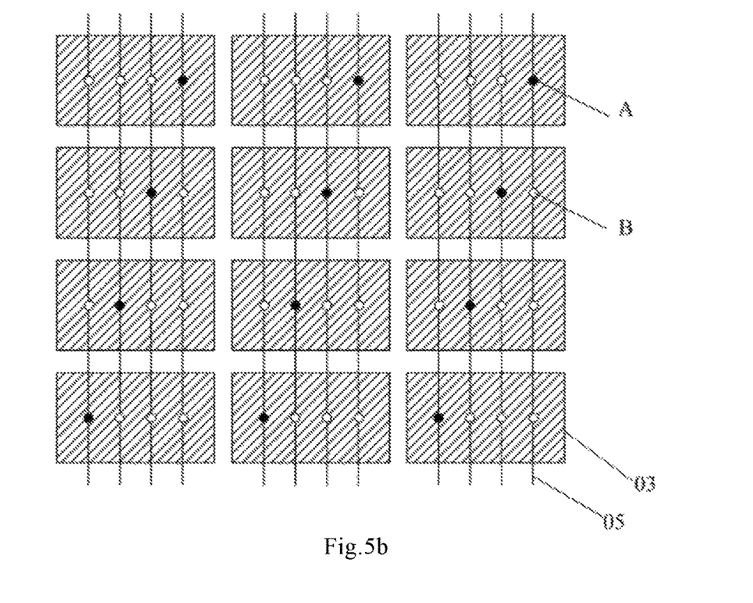

For example, in order to ensure the uniformity of the images displayed in the display area of the touch panel, when the via holes A and the concave parts B are formed, the cross-section shapes of them can be designed as a same shape. For example, they can be designed as circles with a same diameter. Commonly, the via holes A and the concave parts are designed to uniformly distribute in the insulating interlayer 07, as shown in FIG. 5b.

For example, the above touch panel according to an embodiment of the present disclosure can be applied not only in twisted nematic (TN) mode liquid crystal display panel, but also advanced dimension switch (ADS) mode liquid crystal display panel and in In-Plane Switch (IPS) mode liquid crystal display panel. But the disclosure is not limited to the above cases.

For example, in the case where the above touch panel according to an embodiment of the present disclosure is applied in a conventional ADS mode display panel, for example, the common electrode layer is plate-shaped and is disposed on a lower layer (closer to the base substrate), and the pixel electrode is slit-shaped and is disposed on an upper layer (closer to the liquid crystal layer). That is, the common electrode layer is disposed between the pixel electrode and the base substrate of the array substrate, and an insulating layer is disposed between the pixel electrode and the common electrode layer. As for an HADS mode liquid crystal panel, the pixel electrode is plate-shaped and is disposed on a lower layer (closer to the base substrate), and the common electrode layer is slit-shaped and are disposed on an upper layer (closer to the liquid crystal layer). That is, the pixel electrode layer is disposed between the common electrode layer and the base substrate of the array substrate, and an insulating layer is disposed between the pixel electrode and the common electrode layer.

Figure 6A:
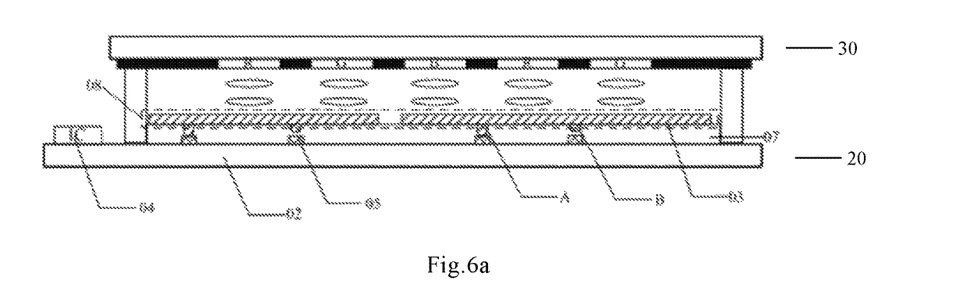
FIG. 6a and FIG. 6b are side cross-section structure schematic views of an in-cell touch panel according to an embodiment of the present disclosure.

When the above touch panel according to at least one embodiment of the present disclosure is applied in an ADS mode display panel, for example, the above touch panel according to an embodiment of the present disclosure is shown in FIG. 6a. The common electrode layer 08 in the array substrate 20 can be reused as self capacitive electrodes 03, i.e., the self capacitive electrodes 03 constitute the common electrode layer 08 on the base substrate 02 of the array substrate. In the touch period, the touch detection chip 04 is configured for detecting whether a touch operation is occurred, while in the display period, the touch detection chip is also configured for applying common electrode signal to each of the self capacitive electrodes 03. The structure of the common electrode layer 08 is divided into self capacitive electrodes 03 to realize the touch function, and this configuration does not need extra process, can save the production cost and increase production efficiency.

Figure 6B:
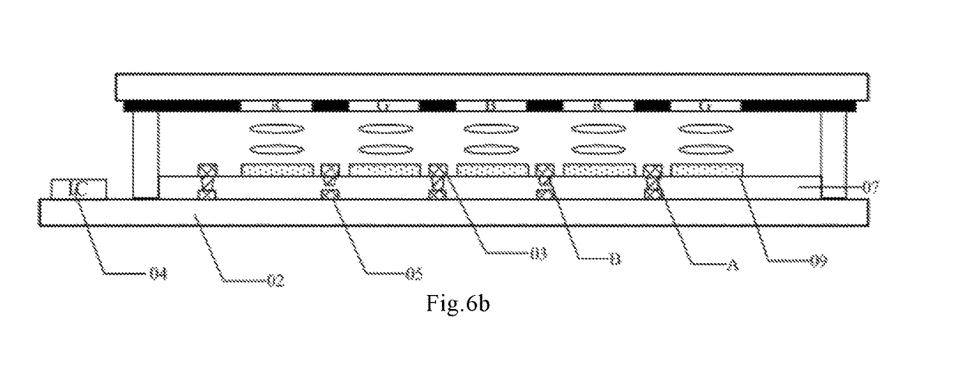

Alternatively, as shown in FIG. 6b, in an embodiment of the present disclosure, the self capacitive electrodes 03 can be disposed on the gaps between the pixel electrodes on the same layer as the pixel electrodes 09, i.e., the self capacitive electrodes 03 and the pixel electrodes 09 on the base substrate 02 of the array substrate are disposed on the same layer, and the pattern of each of the self capacitive electrodes is located on the gaps between two adjacent pixel electrodes 09. The structure of the pixel electrode layer is modified to allow the self capacitive electrodes to be formed on the existing gaps of the pixel electrodes, can be formed based on the common manufacturing process of array substrate, and does not need extra process, can save the production cost and increase production efficiency.

For example, according to the specific mode of the liquid crystal display panel to which the above touch panel is applied, in the case where the common electrode layer 08 reused as self capacitive electrodes 03 is applied, each of the self capacitive electrodes 03 can be provided with a slit-shaped ITO structure or a plate-shaped ITO structure on the position corresponding to the opening area of a pixel, i.e., each of the self capacitive electrodes 03 is formed of a slit-shaped ITO structure in the case of the HADS mode. For example, the slit-shaped ITO structures are slit-shaped ITO electrodes in the opening areas of pixels. In the case of the ADS mode, self capacitive electrodes 03 are formed by plate-shaped ITO electrodes to meet the require of liquid crystal display, and in this situation, self capacitive electrodes 03 can interact with the electric field from the human body through the slits of the pixel electrodes 09. The specific structures of the display panels in the ADS mode and the display panels in the HADS mode will not be repeated here.

Commonly, the resolution of a touch panel is usually in millimeter. Therefore, the size and the occupied area of each of self capacitive electrodes 03 can be selected according to the required touch resolution to ensure the required touch density. For example, each of self capacitive electrodes 03 is designed as a square electrode of about 5 mm*5 mm. And the resolution of a display panel is usually in micrometer, and therefore, one self capacitive electrode 03 usually corresponds to a plurality of sub-pixels in the display panel.

In the above in-cell touch panel according to an embodiment of the present disclosure, in the case where the common electrode layer 08 disposed in the whole layer on the base substrate 02 of the array substrate is divided into a plurality of self capacitive electrodes 03, in order not to affect the normal display function, when the common electrode layer 08 is divided, the dividing lines are commonly disposed in the area of black matrix pattern but away from the opening area. That is, the orthographic projections, which is projected on the base substrate 02 of the array substrate, of the gaps between self capacitive electrodes 03 are commonly located on the gaps of sub-pixels of the base substrate 02 of the array substrate.

Alternatively, in an in-cell touch panel according to an embodiment of the present disclosure, when the pattern of the self capacitive electrodes 03 are disposed on the gaps between pixel electrodes 09, the pattern of the self capacitive electrodes 03 are usually formed in a grid structure in which the pixel electrodes correspond to the mesh openings.

For example, the self capacitive electrodes constitute (are reused as) the common electrode layer on the array substrate. In the touch time period, the touch detection chip is configured for determining the touch location through detecting the change of the capacitance of each of the self capacitive electrodes, while in the display time period, the touch detection chip is also configured for applying common electrode signal to each of the common electrodes. For example, the touch detection chip is realized with an integrated circuit (IC).

For example, as shown in FIG. 6a, an in-cell touch panel according to an embodiment of the present disclosure further comprises an opposite substrate 30. The opposite substrate 30 is disposed opposite to the array substrate 20, and the opposite substrate and the array substrate are the upper substrate and the lower substrate of the in-cell touch panel (display panel) respectively. Generally, display structures such as thin film transistor array are formed on the array substrate, and the color resin is formed on the opposite substrate. For example, the opposite substrate is a color filter substrate. The liquid crystal layer is disposed between the opposite substrate and the array substrate.

For example, the in-cell touch panel mentioned above according to an embodiment of the present disclosure reuses the common electrode layer as self capacitive electrodes. Therefore, in practice, the driving mode of time-sharing of the period of touch and the period of display need to be applied. Further, in practice, the display driving chip and the touch detection chip can be integrated into one chip to further reduce the production cost.

Figure 7A:
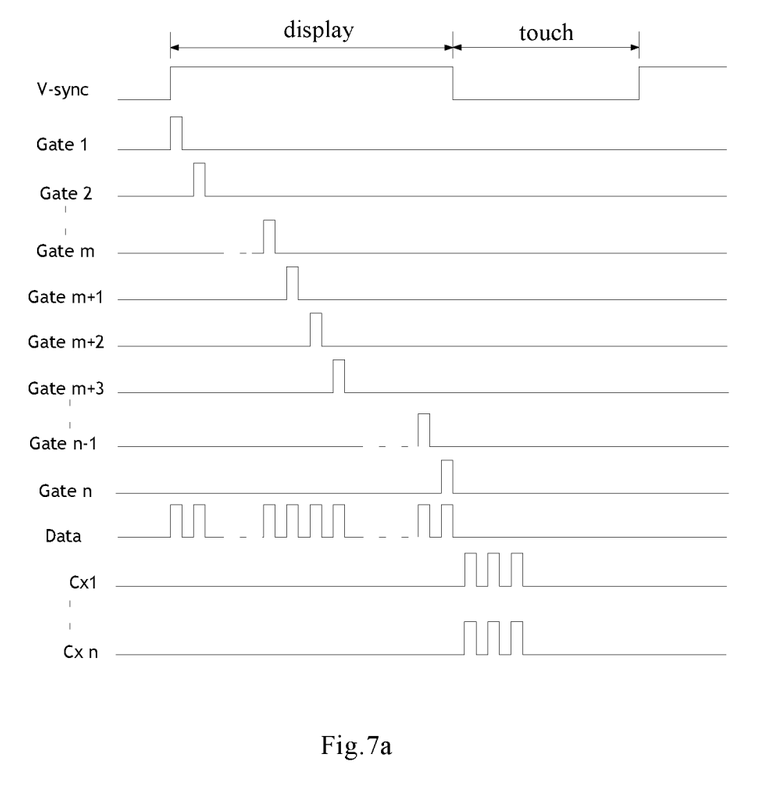
FIG. 7a and FIG. 7b are driving timing schematic views of an in-cell touch panel according to an embodiment of the present disclosure.
Figure 7B:
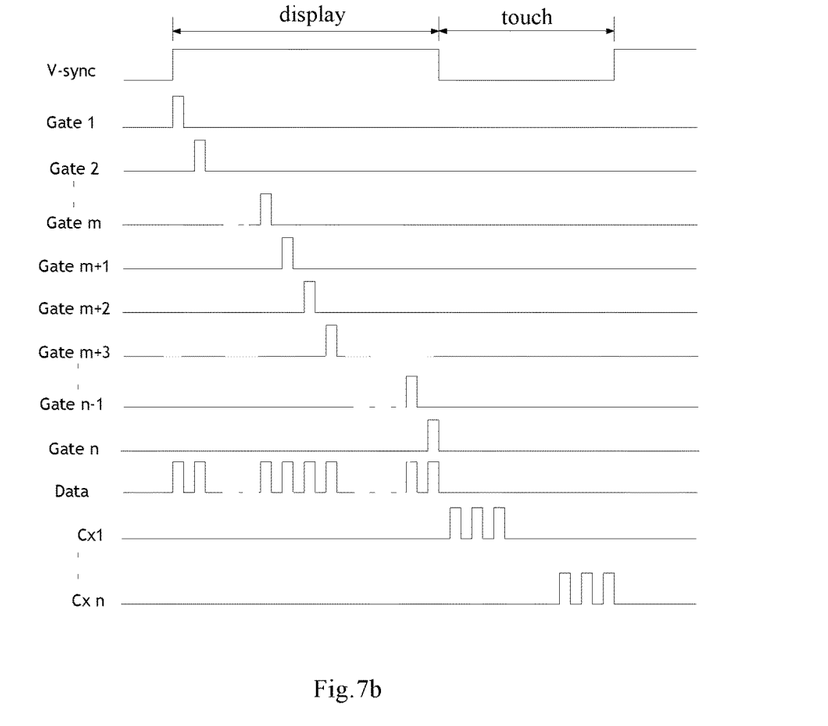

For example, in the driving timing schematic views as shown in FIG. 7a and FIG. 7b, the time of each frame (V-sync) displayed by the display panel is divided into a display time (Display) period and a touch time (Touch) period. For example, as shown in the driving timing schematic views of FIG. 7a and FIG. 7b, the time of one frame displayed by the touch panel is 16.7 ms, 4 ms of which is selected as the touch time period, and the rest 12.7 ms of which is selected as the display time period. Of course, the two touch time and the display time can be properly adjusted according to the processing capacity of the IC chip of the touch detection chip, and no limitation is placed thereto herein. In the display time (Display) period, the gate scanning signals are applied to the gate signal lines Gate1, Gate 2 . . . Gate n of the touch panel in sequence; the gray scale signals are applied to data lines Data; and the common electrode signals are applied to the self capacitive electrodes Cx1 . . . Cx n respectively by the touch detection chip that is connected with the self capacitive electrodes Cx1 . . . Cx n, to realize the display function. In the touch time (Touch) period, as shown in FIG. 7a, for example, the driving signals are applied to the self capacitive electrodes Cx1 . . . Cx n at a same time by the touch detection chip that is connected with the self capacitive electrodes Cx1 . . . Cx n, and the feedback signals of all self capacitive electrodes Cx1 . . . Cx n are received at a same time by the touch detection chip. It also can be that, as shown in FIG. 7b, the driving signals are applied to the self capacitive electrodes Cx1 . . . Cx n in sequence by the touch detection chip that is connected with each of self capacitive electrodes Cx1 . . . Cx n, and the feedback signals of all self capacitive electrodes Cx1 . . . Cx n are received separately by the touch detection chip. No limitation is placed thereto herein. Whether a touch is occurred is judged through analyzing the feedback signals, so that the touch function is realized.

For example, in an in-cell touch panel according to an embodiment of the present disclosure, the capacitance of a human body acts on the self capacitance of self capacitive electrodes 03 in the direct-coupled mode. Therefore, when the panel is touched by a human body, only the capacitance of self capacitive electrode 03 under the touch position is subjected to a great change, and the capacitance of self capacitive electrode 03 adjacent to the self capacitive electrode 03 under the touch position suffers from a small change. So an object is sliding on the touch panel, the touch coordinates of the area in which the self capacitive electrode 03 can not be determined. In order to solve this problem, in an in-cell touch panel according to an embodiment of the present disclosure, for example, the opposite side edges of the two adjacent self capacitive electrodes 03 are formed into zigzag to increase the change of the capacitance of self capacitive electrode 03 adjacent to the self capacitive electrode 03 under the touch position.

For example, any one of the following two ways or the combination thereof can be applied to provide the whole shape of each of self capacitive electrodes 03.

Figure 8A:
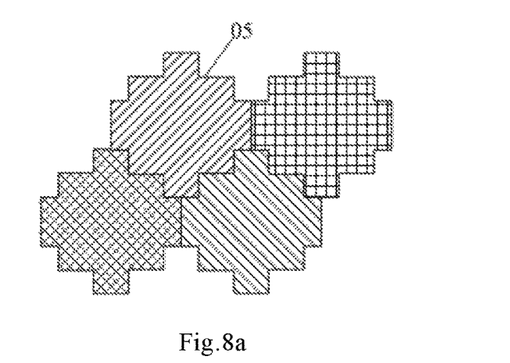
FIG. 8a and FIG. 8b are structure schematic views illustrating the disposition of zigzag side edges opposite to adjacent self capacitive electrodes in an in-cell touch panel according to an embodiment of the present disclosure.

1. The opposite zigzag side edges of adjacent two self capacitive electrodes can be configured as step-shaped structures, and the two step-shaped structures are of the same shape and match each other, as shown in FIG. 8a. FIG. 8a shows 2*2 self capacitive electrodes 03.

Figure 8B:
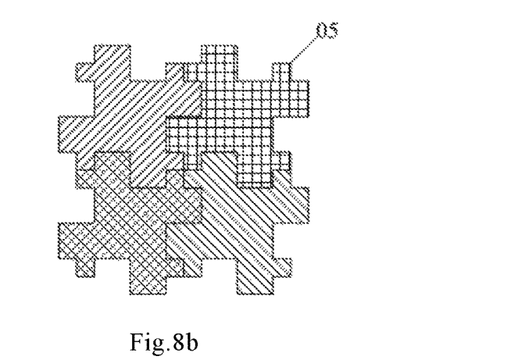

2. The opposite zigzag side edges of adjacent two self capacitive electrodes can be configured as concave-convex shaped structures, and two concave-convex shaped structures are of the same shape and match each other, as shown in FIG. 8b. FIG. 8b shows 2*2 self capacitive electrodes 03.

For example, in an in-cell touch panel according to an embodiment of the present disclosure, any patterning process can be used to manufacture the layers on the array substrate. For example, eight patterning process can be used: patterning of gate electrodes and gate lines→patterning of active layer→patterning of first insulating layer→patterning of data lines, touch lines, source electrodes and drain electrodes→patterning of insulating interlayer→patterning of pixel electrodes→patterning of second insulating layer→patterning of common electrodes. Of course, the process is not limited to the above, and seven patterning process, six patterning process or five patterning process can be used according to the actual design, and no limitation is placed thereto herein.

Base on the same inventive concept, an embodiment of the present disclosure also provides a display device which comprises any one of the in-cell touch panels according to the embodiments of the present disclosure.

For example, the display device can be any product or component having a display function such as mobile phone, tablet computer, television, display screen, laptop computer, digital photo frame, watch, navigator or the like. Any one of the above embodiments of in-cell touch panel can be referred to implement the display device, and similar description will not be repeated here.

An in-cell touch panel and a display device are provided by at least one embodiment of the present disclosure. The in-cell touch panel comprises an array substrate provided with a plurality of sub-pixels, and a plurality of gate lines and a plurality of data lines that are disposed on the array substrate which are intersected with each other and are insulated from each other, a plurality of self capacitive electrodes which are disposed in a same layer and independent of each other, and a plurality of touch lines connecting the self capacitive electrodes to the touch detection chip. The plurality of gate lines and the plurality of data lines are intersected with each other to define the plurality of sub-pixels; each of the sub-pixels comprises a pixel electrode and is configured with a long side and a short side; and the touch lines are disposed along the direction of short sides of the sub-pixels. The embodiments of the present disclosure can increase aperture ratio and reduce power consumption through the new design of the pixel structure and the optimization of the position of touch lines.

The arrangement of the pixels is redesigned in the embodiments of the present disclosure, and this arrangement reduces the effect to aperture ratio caused by introduction of touch lines and also can reduce the power consumption of IC (integrated circuit).

What are described above is related to the illustrative embodiments of the disclosure only and not limitative to the scope of the disclosure, any various changes or replacement within the scope of the disclosure, which can be easily thought out by those skilled in the art, should be included within the scope of the present invention. Therefore, the scopes of the disclosure are defined by the accompanying claims.

The present application claims the priority of the Chinese Patent Application No. 201510047498.1 filed on Jan. 29, 2015, which is incorporated herein in its entirety by reference as part of the disclosure of the present application.

The invention claimed is:

1. An in-cell touch panel, comprising:
an array substrate provided with a plurality of sub-pixels;
a plurality of gate lines and a plurality of data lines that are disposed on the array substrate, intersected with each other and insulated from each other;
a plurality of self capacitive electrodes which are disposed in a same layer and independent of each other; and
a plurality of touch lines connecting the self capacitive electrodes to a touch detection chip,
wherein the plurality of gate lines and the plurality of data lines are intersected with each other to define the plurality of sub-pixels; each of the sub-pixels is configured with a long side and a short side; and the touch lines are disposed along a direction of short sides of the sub-pixels,
wherein the in-cell touch panel further comprises a plurality of redundant metal lines which are insulated from each other and are disposed on a same layer as the touch lines are disposed,
wherein each of the redundant metal lines is parallel to the touch lines and is connected in parallel with the self capacitive electrode which each of the redundant metal lines overlaps,
wherein an insulating interlayer is provided between the self capacitive electrodes and the touch lines, and the self capacitive electrodes are electrically connected with corresponding touch lines through via holes which run through the insulating interlayer, and wherein concave parts are provided in the insulating interlayer in an area in which the self capacitive electrodes overlap other touch lines except the touch lines which are electrically connected with the self capacitive electrodes, the concave parts are right over the other touch lines respectively, and the self capacitive electrodes include convex parts that fill in the concave parts of the insulating interlayer.

2. The in-cell touch panel according to claim 1, wherein a pixel comprises sub-pixels, and the sub-pixels of each pixel are connected with a data line and the plurality of gate lines respectively.

3. The in-cell touch panel according to claim 1, wherein the plurality of touch lines are disposed on the array substrate in a cycle of one or more pixels.

4. The in-cell touch panel according to claim 1, wherein the touch lines and the data lines are disposed on a same layer, insulated from each other, and are routed in a same direction.

5. The in-cell touch panel according to claim 1, wherein each of the sub-pixels comprises a pixel electrode, and pixel electrodes and the touch lines are disposed on a same layer at gaps between two adjacent pixels.

6. The in-cell touch panel according to claim 1, wherein a cross-section shape of the via holes is same as a cross-section shape of the concave parts, and the concave parts are uniformly distributed in the insulating interlayer.

7. The in-cell touch panel according to claim 1, wherein opposite side edges of two adjacent self capacitive electrodes are zigzag.

8. The in-cell touch panel according to claim 7, wherein the zigzag opposite side edges of the two adjacent self capacitive electrodes are configured as step-shaped structures, and the two step-shaped structures are of the same shape and match each other.

9. The in-cell touch panel according to claim 7, wherein the zigzag opposite side edges of the two adjacent self capacitive electrodes are configured as concave-convex shaped structures, and the two concave-convex shaped structures are of the same shape and match each other.

10. The in-cell touch panel according to claim 1, wherein the self capacitive electrodes constitute a common electrode layer which is on the array substrate.

11. The in-cell touch panel according to claim 10, wherein the common electrode layer is disposed between a pixel electrode layer of the array substrate and a base substrate of the array substrate, and an insulating layer is disposed between the pixel electrode layer and the common electrode layer.

12. The in-cell touch panel according to claim 10, wherein a pixel electrode layer is disposed between the common electrode layer and a base substrate of the array substrate, and an insulating layer is disposed between the pixel electrode layer and the common electrode layer.

13. A display device, comprising the in-cell touch panel according to claim 1.

14. The in-cell touch panel according to claim 5, wherein opposite side edges of two adjacent self capacitive electrodes are zigzag.

15. The in-cell touch panel according to claim 6, wherein opposite side edges of two adjacent self capacitive electrodes are zigzag.

* * * * *